(12) United States Patent
Wobben

(10) Patent No.: US 7,098,550 B2
(45) Date of Patent: Aug. 29, 2006

(54) METHOD FOR CONTROLLING A WIND ENERGY PLANT

(76) Inventor: Aloys Wobben, Argestrasse 19, Aurich (DE) 26607

( * ) Notice: Subject to any disclaimer, the term of this patent is extended or adjusted under 35 U.S.C. 154(b) by 111 days.

(21) Appl. No.: 10/475,550

(22) PCT Filed: Apr. 12, 2002

(86) PCT No.: PCT/EP02/04110

§ 371 (c)(1),
(2), (4) Date: Apr. 16, 2004

(87) PCT Pub. No.: WO02/086313

PCT Pub. Date: Oct. 31, 2002

(65) Prior Publication Data

US 2004/0178638 A1  Sep. 16, 2004

(30) Foreign Application Priority Data

Apr. 20, 2001 (DE) .............................. 101 19 625

(51) Int. Cl.
F03D 9/00 (2006.01)
F03D 11/00 (2006.01)
H02P 9/04 (2006.01)

(52) U.S. Cl. ......................................... 290/44; 290/55
(58) Field of Classification Search ................. 290/44, 290/55
See application file for complete search history.

(56) References Cited

U.S. PATENT DOCUMENTS

| 2,444,077 | A | * | 6/1948 | Weathers ................... 318/731 |
| 2,915,655 | A | * | 12/1959 | Baudry ........................ 310/55 |
| 3,173,043 | A | * | 3/1965 | Newill ........................ 310/128 |
| 3,243,688 | A | * | 3/1966 | Brundage ..................... 322/57 |
| 3,923,016 | A | * | 12/1975 | Hoshi ......................... 123/694 |
| 4,109,615 | A | * | 8/1978 | Asano ........................ 123/686 |
| 4,155,335 | A | * | 5/1979 | Hosaka et al. .............. 123/676 |

(Continued)

FOREIGN PATENT DOCUMENTS

DE           33 42 583 A1     6/1985

(Continued)

*Primary Examiner*—Darren Schuberg
*Assistant Examiner*—Pedro J. Cuevas
(74) *Attorney, Agent, or Firm*—Seed IP Law Group PLLC

(57) ABSTRACT

The present invention concerns a method of controlling a wind power installation and a wind power installation in particular for carrying out the method.

Figure 1:
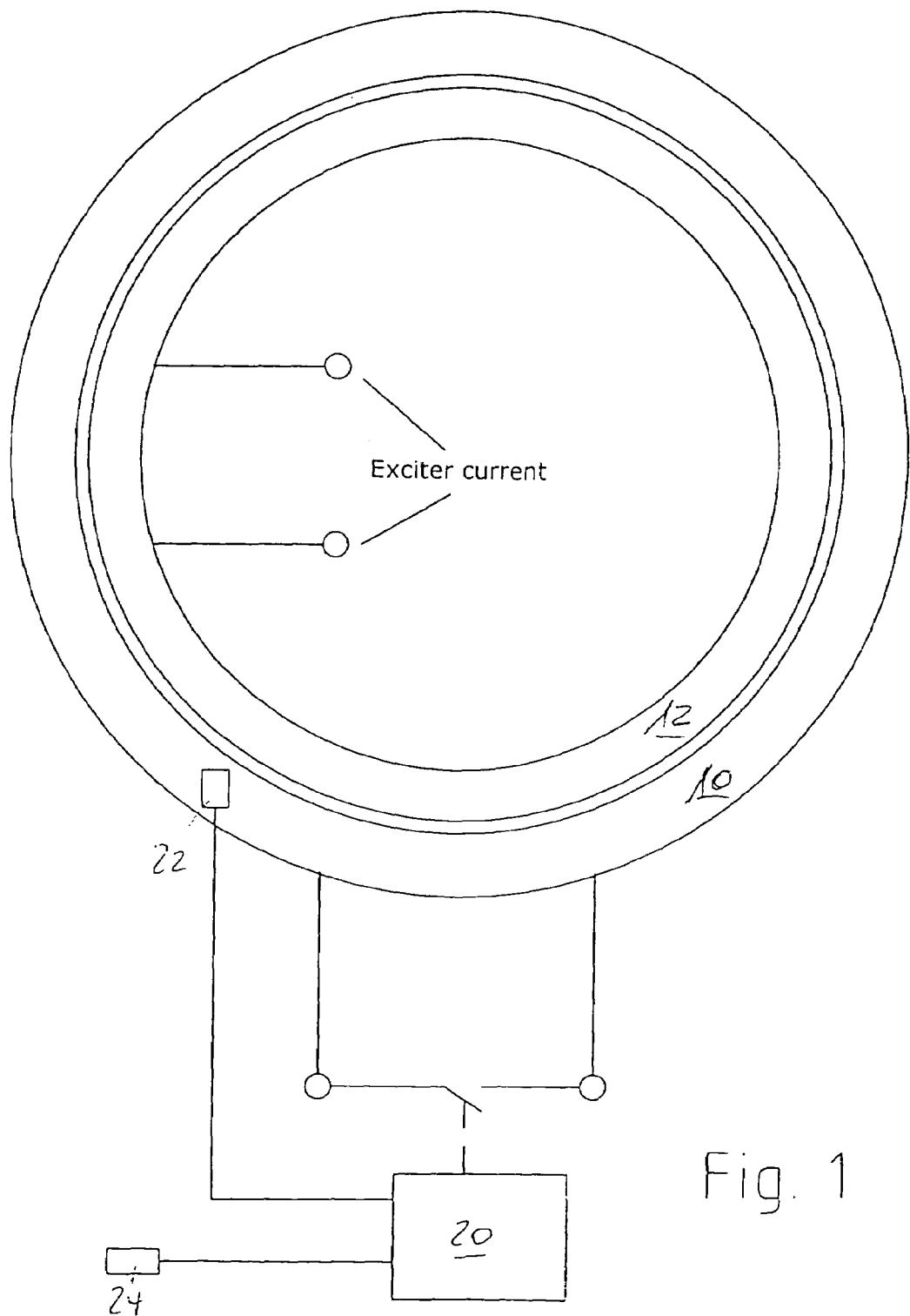

Wind power installations have been generally known for a long time and in recent times are increasingly used as environmentally friendly energy generators.

In that respect it is in the very nature of things that such installations are exposed to the influences of the weather. One of the problems which is of great significance in wind power installations is moisture as wind power installations with their electrical systems must be substantially protected therefrom.

Therefore, the object of the present invention is to eliminate that risk which occurs due to the moisture.

A method of controlling a wind power installation characterised by detecting the temperature of the generator and the temperature of the air in the surroundings of the wind power installation, ascertaining the temperature difference, and heating the generator if the temperature of the generator is below the temperature of the ambient air.

13 Claims, 2 Drawing Sheets

U.S. PATENT DOCUMENTS

| | | | |
|---|---|---|---|
| 4,262,210 A | 4/1981 | Yamine | 290/54 |
| 4,341,190 A * | 7/1982 | Ishikawa et al. | 123/439 |
| 4,387,290 A | 6/1983 | Yasuda | 219/202 |
| 4,583,086 A * | 4/1986 | Andrews et al. | 340/640 |
| 5,075,564 A * | 12/1991 | Hickey | 290/55 |
| 5,103,629 A * | 4/1992 | Mumford et al. | 60/778 |
| 5,254,876 A * | 10/1993 | Hickey | 290/55 |
| 5,388,015 A * | 2/1995 | Schandl et al. | 360/69 |
| 5,806,763 A | 9/1998 | Jones | 236/44 C |
| 6,542,779 B1 * | 4/2003 | Lee | 607/100 |
| 6,676,122 B1 * | 1/2004 | Wobben | 290/55 |
| 6,774,504 B1 * | 8/2004 | Lagerwey | 290/44 |
| 6,910,859 B1 * | 6/2005 | Bluhm et al. | 415/191 |
| 2005/0040776 A1 * | 2/2005 | Sibley | 318/150 |
| 2005/0082836 A1 * | 4/2005 | Lagerwey | 290/44 |
| 2005/0121992 A1 * | 6/2005 | Leonov | 310/183 |

FOREIGN PATENT DOCUMENTS

| | | |
|---|---|---|
| EP | 859450 A2 * | 8/1998 |
| FR | 2 728 514 | 6/1996 |

* cited by examiner

METHOD FOR CONTROLLING A WIND ENERGY PLANT

The present invention concerns a method of controlling a wind power installation and a wind power installation in particular for carrying out the method.

Wind power installations have been generally known for a long time and in recent times are increasingly used as environmentally friendly energy generators.

In that respect it is in the very nature of things that such installations are exposed to the influences of the weather. One of the problems which is of great significance in wind power installations is moisture as wind power installations with their electrical systems must be substantially protected therefrom.

However, such installations cannot be hermetically sealed off in order reliably to avoid the ingress of moisture so that moisture must be kept away from certain parts of the installation by a further encapsulation means such as a cabinet. However such an encapsulation means is not possible in particular in the region of the wind power installation pod with large metallic masses such as the generator.

On the other hand however it is precisely large masses that also lead to a major problem if for example they are cooled down overnight and then the temperature in the area surrounding the installation rises.

As warm air can store more moisture than cold air therefore that moisture-enriched warm air also passes into the pod and there encounters the generator which is still cold when the installation is in a stopped condition. The moisture is then deposited on the generator and condenses to form water which can then occur in large quantities.

That is a particular problem in wind power installations involving a ring generator where the water passes into the generator and can then result in considerable damage when the generator starts up, when it is supplied with exciter power.

Therefore, the object of the present invention is to eliminate that risk which occurs due to the water.

That object is attained by a method of the kind set forth in the opening part of this specification, by the following steps:

a) detecting the temperature of the generator and the temperature of the air in the surroundings of the wind power installation, b) ascertaining the temperature difference, and c) heating the generator if the temperature of the generator is below the temperature of the ambient air.

In addition that object is attained by a wind power installation of the kind set forth in the opening part of this specification, having a device for short-circuiting of the stator, a control with at least two temperature pick-ups for sensing the temperature of the generator and the ambient air, and a device for comparing the temperatures so that the control can short-circuit the stator of the generator in dependence on the temperature difference and can act on the rotor with a predetermined exciter current.

Alternatively or supplemental to the above-described structure it can also be provided that disposed within the pod of a wind power installation, for example on parts of the generator or other electrically sensitive parts, is a moisture and/or condensate sensor as a means for detecting the moisture or the condensate which occurs there and the value detected by the sensor is processed in a control device and heating of the generator with the means described in this application or heating of other parts of the wind power installation is effected if the measured moisture and/or condensate value is above a predetermined value.

The invention is described in greater detail hereinafter with reference to the drawings in which:

FIG. 1 is a simplified view of a stator and a rotor of a generator, and

Figure 2:
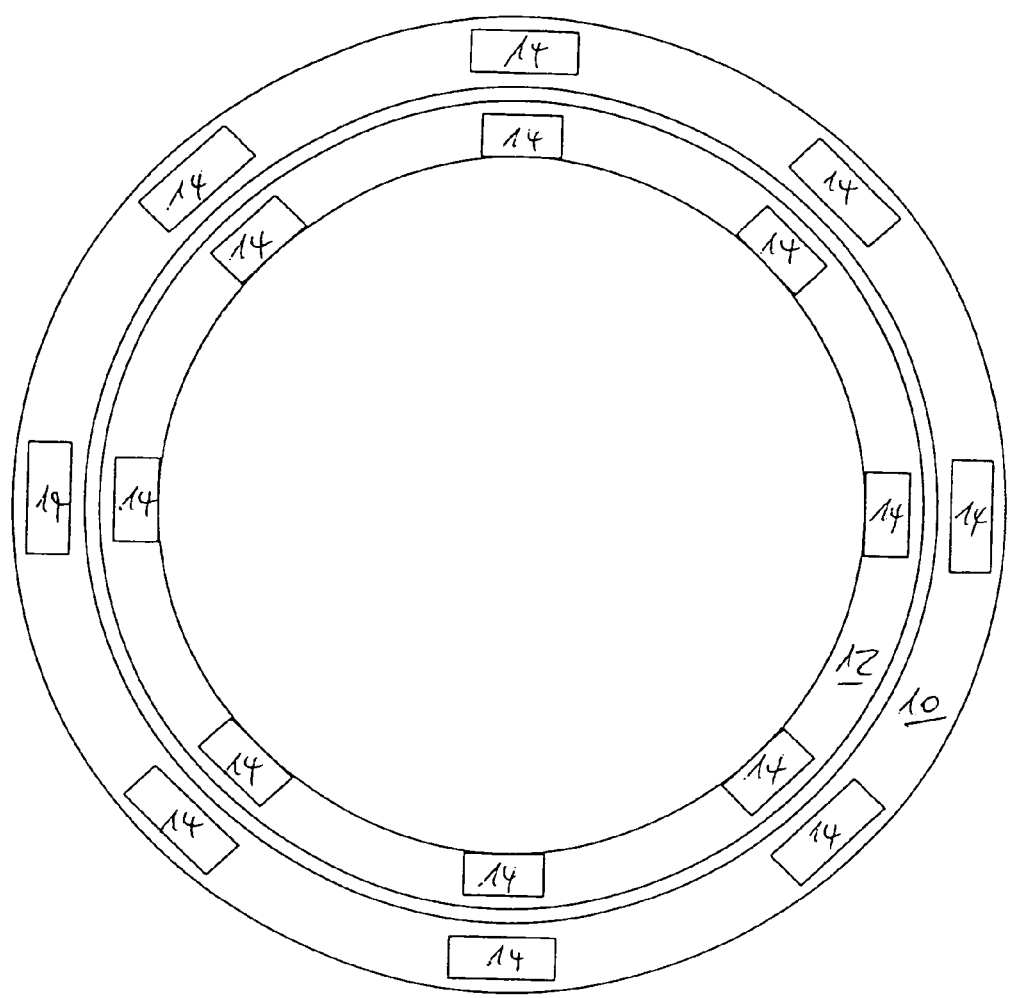

FIG. 2 also shows a stator and a rotor of a generator in an alternative embodiment.

FIG. 1 is a greatly simplified view showing a generator comprising a stator 10 and a rotor 12. The stator 10 has connecting terminals, at which the electrical energy can be taken off in normal operation. The rotor 12 also has connecting terminals, by way of which the exciter current is supplied.

Shown between the connecting terminals of the stator 10 is a contact which is actuated by the control device 20 and short-circuits the stator connections.

The control device 20 detects the temperature of the generator (in this case the stator) and the temperature in the surroundings of the wind power installation by way of two temperature sensors 22, 24.

If the temperature of the stator as detected with the sensor 22 is lower than the temperature of the environment as detected by the sensor 24 the contact between the connecting terminals of the stator is closed and thus a short-circuit is produced.

Then a predeterminable exciter current is fed into the rotor 12 by way of the connecting terminals thereof. The power induced in the stator of the generator can be influenced by the magnitude of the exciter current fed into the rotor 12.

When the stator is short-circuited, the stator voltage is very low and in that situation a very high current (short-circuit current) flows, which causes a corresponding joulean heat to be produced in the stator. The generator generally is heated up by that joulean heat so that the moisture evaporates. Accordingly, with the invention, even the formation of condensate water is registered in the optimised generator housing by means of monitoring involving measuring technology, and in that case the wind power installation (in the start-up mode) starts automatically in the very substantially voltage-less warming mode which causes the residual moisture in the generator to evaporate. So that the ingress of moisture into the pod of the wind power installation is as slight as possible, the entire pod housing is of a water-tight configuration so that the ingress of conducting material such as moisture is prevented by the external cladding (on the pod).

In a preferred development of the invention heating of the generator is continued until the temperature of the generator exceeds the temperature of the ambient air by a predetermined amount, before the wind power installation changes over into the normal mode, that is to say before the short-circuit of the stator is removed and normal exciter power is fed into the arrangement.

FIG. 2 shows an alternative embodiment of the generator comprising a stator 10 and a rotor 12.

In this embodiment arranged on the stator 10 and the rotor 12 are heating resistors 14 which are distributed uniformly around the periphery. If now the control 20 (not shown) detects the temperature difference between the stator 10 of the generator and the ambient air the heating resistors 14 are switched on and thus the generator is heated up. The moisture in the generator evaporates and, after a predetermined time or when a predetermined temperature difference is reached between the temperature of the stator 10 and the rotor 12 and the ambient air, normal operation can be adopted.

A specific heating means can be provided not only for the generator but also for other electrically sensitive parts of the wind power installation in the interior thereof. Such a heating means is regularly controlled like the generator heating, that is to say a heating effect takes place when the part to be heated is at a temperature which is lower than the outside ambient temperature so that the deposit of moisture on the electrical part is prevented.

Finally it is also possible, alternatively or supplemental to temperature detection of the generator or the ambient air, to provide one (or more) moisture/condensate sensors which is or are disposed on the generator (or other sensitive parts) and which detects or detect the moisture and/or condensates-deposited on the generator and if that sensor is connected to the control device generator heating is automatically triggered if the condensate measured with the sensor exceeds a given value.

Finally it is also proposed that further evaporation-promoting means be provided if the problem could relatively frequently occur that a deposit of moisture is formed on the generator or other electrically sensitive parts. To promote rapid drying of the generator or other electrically sensitive parts, it is also possible to provide a blower which operates like a hairdryer and which passes heated air on to the respective parts which are to be dried. Thus for example the blowers which are normally provided in any wind power installation for supplying fresh air can also be arranged downstream of a heating means so that the fresh air supplied is diverted in a heated condition into the interior of the generator pod and thus a deposit of moist air on electrically sensitive parts, for example the generator, is prevented.

The invention of the present application also includes only detecting in any conceivable fashion the moisture (moisture deposit) which is formed on or at the generator or other electrical parts of the wind power installation. That can also be effected by measuring at particularly sensitive regions whether a flow of current can occur there at the surface, which is possible only when a deposit of moisture has been formed.

The invention claimed is:

1. A method of controlling a wind power installation, comprising:
   detecting the temperature of a generator and the temperature of the ambient air in the surroundings of the wind power installation,
   ascertaining the temperature difference,
   heating the generator if the temperature of the generator is at a selected value relative to the temperature of the ambient air,
   short-circuiting the generator stator, and
   applying a predeterminable exciter current to the generator rotor.

2. The method as set forth in claim 1 characterized in that heating of the generator is effected for a predetermined time or until the temperature of the generator exceeds the ambient temperature by a predetermined amount.

3. A wind power installation for carrying out the method as set forth in claim 1, characterized in that there are provided at least two temperature pick-ups of which one detects the temperature of the generator of the wind power installation or other parts of the wind power installation and the other temperature pick-up detects the temperature in the surroundings of the wind power installation, that there is also provided a comparison device which compares the temperature values of the two temperature pick-ups and heating of the generator or other parts of the wind power installation is effected if a temperature difference in the two recorded temperatures was established, in accordance with which the temperature of the generator or other parts within the wind power installation is below the temperature of the ambient air.

4. A wind power installation for carrying out the method as set forth in claim 1,
   comprising an electrical generator for producing electrical energy, characterized by a device for short-circuiting the stator, and
   a control having at least two temperature pick-ups for sensing the temperature of the generator and the ambient air, and a device for comparing the temperatures so that the generator heating is controllable in dependence on the temperature difference.

5. The method as set forth in claim 1 characterized in that heating of the generator is effected if the temperature of the generator is below the temperature of the ambient air by a threshold amount.

6. A wind power installation for carrying out the method as set forth in claim 1,
   comprising an electrical generator for producing electrical energy, characterized by a device for heating the generator or other electrically sensitive parts within the wind power installation, and
   a control having at least two temperature pick-ups for sensing the temperature of the generator and the ambient air, and a device for comparing the temperatures so that the generator heating is controllable in dependence on the temperature difference.

7. A method of controlling a wind power installation characterized by the following steps:
   detecting a moisture deposit on parts of a generator or other electrically sensitive parts of the wind power installation, and
   heating the generator if the moisture deposit is above a predetermined value.

8. The method as set forth in claim 7 characterized by the following steps:
   short-circuiting the generator stator, and
   applying a predeterminable exciter current to the generator rotor.

9. A wind power installation, comprising:
   means for detecting the moisture which forms within the wind power installation, wherein the means detects the presence of a moisture deposit on electrically sensitive parts of the wind power installation and,
   means for heating said electrically sensitive parts of the wind power installation.

10. A wind power installation as set forth in claim 9, further including means for measuring the moisture which forms within a wind power installation, wherein the means measures the amount of a moisture deposit on electrically sensitive parts of the wind power installation.

11. A wind power installation as set forth in claim 10, characterized in that the means for heating performs heating of electrically sensitive parts of the wind power installation if the measured moisture exceeds a selected value.

12. The method as set forth in claim 1 wherein the heating of the generator is effected if the temperature of the generator equals the temperature of the ambient air.

13. A wind power apparatus comprising:
- a first sensor that detects the temperature of a generator;
- a second sensor that detects the temperature of the ambient air in the surroundings of the wind power installation;
- a control circuit that detects the temperature difference;
- a heater that heats the generator if the temperature of the generator is approximately equal to or below the temperature of the ambient air; and
- a sensor for detecting the presence of a moisture deposit on electrically sensitive parts of the wind power installation.

* * * * *